(12) United States Patent
Zhang

(10) Patent No.: US 12,022,977 B2
(45) Date of Patent: Jul. 2, 2024

(54) AIR FRYER HAVING BROILING AND BAKING FUNCTIONS

(71) Applicant: Ningbo Careline Electric Appliance Co., Ltd., Zhejiang (CN)

(72) Inventor: Yichi Zhang, Zhejiang (CN)

(73) Assignee: NINGBO CARELINE ELECTRIC APPLIANCE CO., LTD., Zhejiang (CN)

( * ) Notice: Subject to any disclaimer, the term of this patent is extended or adjusted under 35 U.S.C. 154(b) by 237 days.

(21) Appl. No.: 17/471,237

(22) Filed: Sep. 10, 2021

(65) Prior Publication Data

US 2022/0240718 A1 Aug. 4, 2022

(30) Foreign Application Priority Data

Feb. 3, 2021 (CN) .......................... 202110147289.X
Feb. 3, 2021 (CN) .......................... 202120304312.7

(51) Int. Cl.
*A47J 37/06* (2006.01)
*A47J 27/12* (2006.01)

(52) U.S. Cl.
CPC .......... *A47J 37/0641* (2013.01); *A47J 27/12* (2013.01); *A47J 37/0664* (2013.01)

(58) Field of Classification Search
CPC .............................. A47J 27/004; A47J 27/13; A47J 27/12; A47J 37/0641; A47J 37/0664;

(Continued)

(56) References Cited

U.S. PATENT DOCUMENTS

2008/0168975 A1  7/2008  Chang
2016/0174764 A1* 6/2016  Xiao ................... A47J 37/1209
                                                          99/447

(Continued)

FOREIGN PATENT DOCUMENTS

CN     102319025 A   1/2012
CN     202713407 U   1/2013

(Continued)

OTHER PUBLICATIONS

First Office Action issued in Application No. CN202110147289.X dated Feb. 16, 2022.

(Continued)

*Primary Examiner* — Helena Kosanovic
*Assistant Examiner* — Bonita Khlok
(74) *Attorney, Agent, or Firm* — Dinsmore & Shohl LLP

(57) ABSTRACT

An air fryer having broiling and baking functions comprises a cooking cavity, located in the air fryer, a heat circulation fan and a heating device mounted in an upper part of the cooking cavity; a heating plate, provided at the bottom of the cooking cavity; and a frying basket assembly, provided in the cooking cavity, wherein the frying basket assembly comprises a frying basket body and a broiling board provided at the bottom of the frying basket body, and the broiling board is heated by the heating plate. Further disclosed is a frying basket structure for an air fryer, comprising a frying basket body, located in a cooking cavity inside the air fryer, wherein a hollowed-out opening is provided at bottom of the frying basket body; and a broiling board, detachably fixed at the bottom of the frying basket body and covering the hollowed-out opening.

6 Claims, 6 Drawing Sheets

(58) Field of Classification Search
CPC .. A47J 27/002; A47J 37/0688; A47J 37/0694; F24C 15/322–325
USPC .......... 99/339, 376, 447–448, 450; 219/392, 219/399–400
See application file for complete search history.

(56) References Cited

U.S. PATENT DOCUMENTS

| | | | | |
|---|---|---|---|---|
| 2018/0078089 | A1* | 3/2018 | Sauer | A47J 37/0641 |
| 2018/0325322 | A1* | 11/2018 | De' Longhi | A47J 43/046 |
| 2019/0045973 | A1* | 2/2019 | Gill | A23L 5/13 |
| 2019/0254476 | A1* | 8/2019 | Anthony | A47J 37/0664 |
| 2019/0298105 | A1* | 10/2019 | Floessholzer | A47J 37/0641 |
| 2021/0219778 | A1* | 7/2021 | Senders | A47J 37/0664 |

FOREIGN PATENT DOCUMENTS

| | | |
|---|---|---|
| CN | 202828397 U | 3/2013 |
| CN | 104257250 A | 1/2015 |
| CN | 206371934 U | 8/2017 |
| CN | 206451923 U | 8/2017 |
| CN | 206603656 U | 11/2017 |
| CN | 207012112 U | 2/2018 |
| CN | 207940757 U | 10/2018 |
| CN | 208192915 U | 12/2018 |
| CN | 208510799 U | 2/2019 |
| CN | 110613366 A | 12/2019 |
| CN | 110754929 A | 2/2020 |
| CN | 210455775 U | 5/2020 |
| CN | 210784045 U | 6/2020 |
| CN | 111772499 A | 10/2020 |
| CN | 112155438 A | 1/2021 |
| JP | 2005034646 A | 2/2005 |
| KR | 20120108693 A | 10/2012 |
| TW | 515352 U | 12/2002 |

OTHER PUBLICATIONS

Second Office Action issued in Application No. CN202110147289.X dated Jul. 15, 2022.
Third Office Action issued in Application No. CN202110147289.X dated Oct. 18, 2022.
Reject Decision issued in Application No. CN202110147289.X dated Feb. 2, 2023.
Partial European Search Report issued in Application No. EP21196014.1 dated Mar. 25, 2022.
Supplementary Search Report issued in Application No. CN202110147289.X.
Second Supplementary Search Report issued in Application No. CN202110147289.X.

* cited by examiner

AIR FRYER HAVING BROILING AND BAKING FUNCTIONS

CROSS-REFERENCE TO RELATED APPLICATIONS

The present disclosure claims the priority to the Chinese patent application with the filing No. CN202110147289.X, filed on Feb. 3, 2021 with the Chinese Patent Office, and entitled "Air Fryer Having Broiling and Baking Functions", and the Chinese patent application with the filing No. CN202120304312.7, filed on Feb. 3, 2021 with the Chinese Patent Office, and entitled "Frying Basket Structure for Air Fryer", the contents of which are incorporated herein by reference in entirety.

TECHNICAL FIELD

The present disclosure relates to the technical field of air fryers, in particular, to an air fryer having broiling and baking functions and a frying basket structure for the air fryer.

BACKGROUND ART

Air fryers are kitchen appliances that are now a favorite. The frying basket structure of existing air fryer are in two forms: a single pot and double pots, in which the single-pot frying basket structure generally includes a frying basket body and a frying board provided therein, the frying board is provided with a through hole, and at the same time, food is placed on the frying board, so as to realize the effect of frying food with air. This frying basket structure can only perform a single air frying function, and the use range is limited.

SUMMARY

In order to solve various technical problems and defects above, the present disclosure provides an air fryer having broiling and baking functions and a frying basket structure for the air fryer.

Technical solutions of the present disclosure are as follows.

The present disclosure provides an air fryer having broiling and baking functions, and by providing a broiling board at the bottom of the frying basket, the air fryer further has broiling and baking functions.

In order to achieve the above objectives, the present disclosure provides a following technical solution: an air fryer having broiling and baking functions, including:

a cooking cavity, located in the air fryer, wherein a hot air frying system consisting of a heat circulation fan and a heating device is mounted in an upper part of the cooking cavity, and hot air generated by the heating device is blown by the heat circulation fan to a lower part of the cooking cavity, and may cook food placed in the cooking cavity;

a heating plate, provided at the bottom of the cooking cavity; and a frying basket assembly, provided in the cooking cavity, wherein the frying basket assembly includes a frying basket body and a broiling board provided at the bottom of the frying basket body, and the broiling board is heated by the heating plate, in this way, the food may be placed on the broiling board, enabling the air fryer to have broiling and baking functions, moreover, the implementation of the original air fryer functions is not affected while having the broiling and baking functions.

In one or more embodiments, the bottom of the frying basket body is provided with a hollowed-out opening, the broiling board is detachably fixed at the bottom of the frying basket body and covers the hollowed-out opening, and the broiling board is provided with several flow guide convex ribs. The flow guide convex ribs may support the food to expose an underside surface of the food, rendering better broiling and baking effects.

In one or more embodiments, the flow guide convex ribs are arc-shaped, and are arranged at intervals around a center portion of the broiling board. In addition to supporting food, the flow guide convex ribs further may guide hot air when performing the broiling and baking functions and the air frying function, to converge airflow into the center portion of the broiling board, thus achieving a better cooking effect.

In one or more embodiments, at the hollowed-out opening at the bottom of the frying basket body, an upwardly extending enclosing portion is provided so that a circle of groove is formed around the bottom of the frying basket body, and an edge of the broiling board extends to be located above the groove. Grease produced by the food during cooking may flow into the groove along the frying board or the broiling board.

In one or more embodiments, several elastic sheets are installed at a lower side of the broiling board, and the elastic sheets are cooperatively clamped (snapped) with a crimped portion at the top of the enclosing portion. The crimped portion may be embedded into and slid out from the elastic sheets due to the elasticity of the elastic sheets, realizing the detachable installation of the broiling board.

In one or more embodiments, several notches are provided in a lower part of the broiling board, and the elastic sheets are provided in the notches and each have one end connected fixedly to the broiling board via a fastener. The elastic sheets realize transverse limiting and vertical fixing through the notches and the fasteners, ensuring the reliability of the installation of the elastic sheets.

In one or more embodiments, the elastic sheet is provided with a downwardly arranged hand operating portion, a limiting protrusion is provided in an upper part of the hand operating portion, the crimped portion is clamped on an upper side of the limiting protrusion, and a lower end of the hand operating portion is deformed by stress to disengage the crimped portion from the limiting protrusion. The broiling board may be firmly fixed by clamping the limiting protrusion with the crimped portion, and the broiling board may be detached only by being pulled upwards hard.

In one or more embodiments, a frying board is provided in a middle-lower part of the frying basket body above the broiling board, a through hole is provided in the frying board and an edge of the frying board is erected on a step formed on a side wall of the frying basket body. The food may be placed on the frying board, and the food on the frying board may be heated and cooked by the air fryer function. The frying board and the broiling board may be used together, and the placement of the frying board will not affect the use of the broiling board, or they may also be used alone.

In one or more embodiments, the frying basket assembly may be taken out from the cooking cavity, and the frying basket assembly includes a handle assembly mounted at one side of the frying basket body, and the frying basket assembly may be taken out easily from the cooking cavity through the handle assembly.

The handle assembly includes a connecting bracket fixed to the frying basket body and a handle portion detachably connected to the connecting bracket. Through rapid connection between the connecting bracket and the handle portion, rapid disassembly of the handle assembly may be realized. Meanwhile, in order to improve the aesthetic appearance, a cover plate and a decorative sheet are installed on a side wall of the handle portion, and the decorative sheet may be changed according to different models and aesthetic requirements.

In one or more embodiments, the heating device and the heat circulation fan are at least partially overlapped in a height direction, and the heating device is provided around the outside of the heat circulation fan, so as to reduce the height of the air fryer.

Compared with the prior art, the air fryer having broiling and baking functions provided in the present disclosure can realize the following beneficial technical effects: the heating plate is provided at the bottom of the cooking cavity, the center of the bottom of the frying basket body is designed to be hollowed out, the broiling board is provided at the hollowed-out part, after the frying basket assembly is placed in the cooking cavity, the broiling board is just provided close to the heating plate, therefore, the broiling board will have a higher temperature, and may directly broil and bake the food placed thereon. The broiling board is provided with the flow guide convex ribs thereon, and food such as fish may be directly placed on the broiling board to be broiled and baked, so that the conventional air fryer is enabled to have the broiling and baking functions, and the use range of the air fryer is enlarged.

The present disclosure further provides a frying basket structure for an air fryer, wherein food is cooked by broiling or baking by providing a broiling board at bottom of a frying basket.

In order to achieve the above objective, the present disclosure provides a following technical solution: a frying basket structure for an air fryer, including:
- a frying basket body, located in a cooking cavity inside the air fryer, wherein a hollowed-out opening is provided at bottom of the frying basket body; and
- a broiling board, detachably fixed at the bottom of the frying basket body and covering the hollowed-out opening. By covering the hollowed-out opening with the broiling board, grease of food on the broiling board will not flow to below the frying basket body, and the broiling board is also easily fixed.

In one or more embodiments, the broiling board is provided with several flow guide convex ribs. The flow guide convex ribs may support the food, so that an underside surface of the food is exposed, rendering better broiling and baking effects.

In one or more embodiments, the flow guide convex ribs are arc-shaped, and are arranged at intervals around a center portion of the broiling board. In addition to supporting food, the flow guide convex ribs further may guide hot air when performing the broiling and baking functions and the air frying function, so as to converge airflow into the center portion of the broiling board, thus achieving a better cooking effect.

In one or more embodiments, at the hollowed-out opening at the bottom of the frying basket body, an upwardly extending enclosing portion is provided so that a circle of groove is formed around the bottom of the frying basket body, and an edge of the broiling board extends to be located above the groove. Grease produced by the food during cooking may flow into the groove along the frying board or the broiling board.

In one or more embodiments, several elastic sheets are installed at a lower side of the broiling board, and the elastic sheets are cooperatively clamped with a crimped portion at the top of the enclosing portion. The crimped portion may be embedded into and slid out from the elastic sheets due to the elasticity of the elastic sheets, realizing the detachable installation of the broiling board.

In one or more embodiments, several notches are provided in a lower part of the broiling board, and the elastic sheets are provided in the notches and each have one end connected fixedly to the broiling board via a fastener. The elastic sheets realize transverse limiting and vertical fixing through the notches and the fasteners, ensuring the reliability of the installation of the elastic sheets.

In one or more embodiments, the elastic sheet is provided with a downwardly extending hand operating portion, a limiting protrusion is provided in an upper part of the hand operating portion, the crimped portion is clamped on an upper side of the limiting protrusion, and a lower end of the hand operating portion is deformed by stress to disengage the crimped portion from the limiting protrusion. The broiling board may be firmly fixed by clamping the limiting protrusion with the crimped portion, and the broiling board may be detached only by being pulled upwards hard.

In one or more embodiments, a frying board is provided in a middle lower part of the frying basket body above the broiling board, and a through hole is provided in the frying board and an edge of the frying board is erected on a step formed on a side wall of the frying basket body. The food may be placed on the frying board. The frying board may be used together with the broiling board, or may also be used alone.

In one or more embodiments, a handle is installed at one side of the frying basket body.

In one or more embodiments, the broiling board is a non-porous board, and meanwhile can completely cover the hollowed-out opening, avoiding grease from dripping down to the outside of the frying basket.

Compared with the prior art, the frying basket structure for an air fryer provided in the present disclosure can realize the following beneficial technical effects:

The broiling board is provided at the bottom of the frying basket body of the frying basket structure, the broiling board is detachably fixed at the hollowed-out opening at the bottom of the frying basket body, and the broiling board is provided with the flow guide convex ribs, then the broiling and baking functions may be realized, and the use range of the air fryer is enlarged.

DETAILED DESCRIPTION OF EMBODIMENTS

Figure 1:
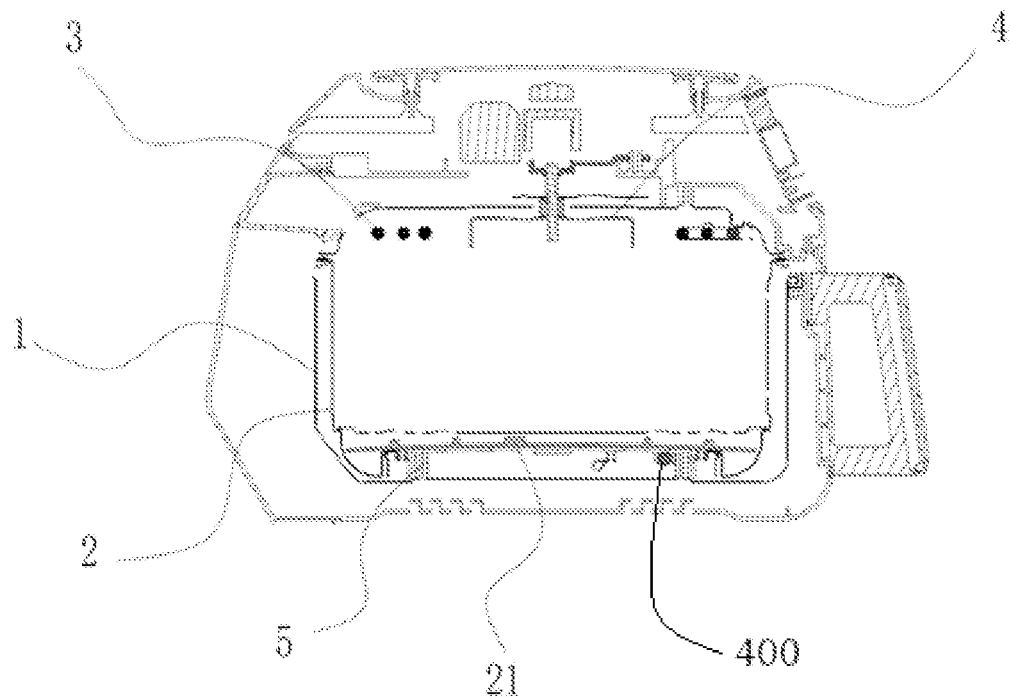
FIG. 1 is a front semi-sectional structural view of an air fryer provided in the present disclosure.
Figure 2:
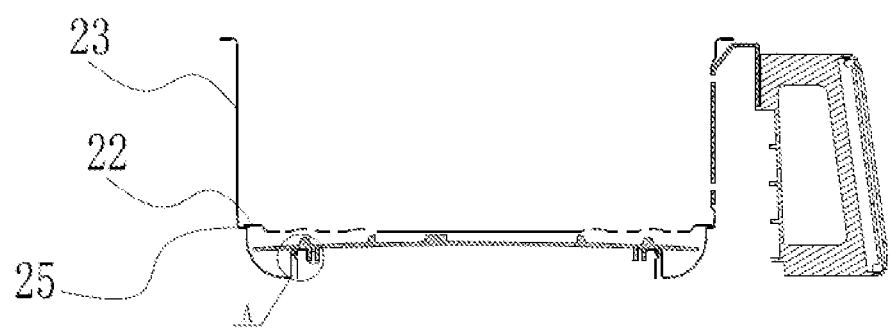
FIG. 2 is a front semi-sectional structural view of a frying basket assembly of the air fryer provided in the present disclosure.

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in various different configurations.

Therefore, the following detailed description of the embodiments of the present disclosure provided in the accompanying drawings is not intended to limit the scope of protection of the present disclosure, but merely represents chosen embodiments of the present disclosure. Based on the embodiments in the present disclosure, all of other embodiments obtained by those ordinarily skilled in the art without using creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be noted that orientation or positional relationships indicated by terms such as "upper", "lower", "inner", and "outer", if appear, are based on orientation or positional relationships as shown in the accompanying drawings, or orientation or positional relationships of a product in the present disclosure when being conventionally placed in use, merely for facilitating describing the present disclosure and simplifying the description, rather than indicating or suggesting that related apparatuses or elements have to be in the specific orientation or configured or operated in a specific orientation, therefore, they should not be construed as limitation on the present disclosure. Besides, terms such as "first" and "second", if appear, are merely for distinguishing description, but should not be construed as indicating or implying importance in the relativity.

Moreover, the terms "horizontal", "vertical", "overhanging", and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "install", "link", and "connect" should be understood in a broad sense, for example, a connection may be a fixed connection, a detachable connection, or an integrated connection; it may be a mechanical connection or an electrical connection; it may be direct linking or indirect linking through an intermediate medium, and it also may be inner communication between two elements. For a person ordinarily skilled in the art, specific meanings of the above-mentioned terms in the present disclosure could be understood according to specific circumstances.

It should be indicated that the features in the embodiments of the present disclosure may be combined with each other without conflict.

As shown in FIGS. 1-5, the present disclosure provides an air fryer having broiling and baking functions, including:

a cooking cavity 1, located in the air fryer, wherein a hot air frying system consisting of a heat circulation fan 4 and a heating device 3 is mounted in an upper part of the cooking cavity 1, and hot air generated by the heating device 3 is blown by the heat circulation fan 4 to a lower part of the cooking cavity 1, and may cook food placed in the cooking cavity 1;

a heating plate 5, provided at the bottom of the cooking cavity 1; and a frying basket assembly 2, provided in the cooking cavity 1, wherein the frying basket assembly 2 includes a frying basket body 23 and a broiling board 21 provided at the bottom of the frying basket body 23, the broiling board 21 is heated by the heating plate 5, in this way, the food may be placed on the broiling board 21, enabling the air fryer to have broiling and baking functions, moreover, the implementation of the original air fryer function is not affected while having the broiling and baking functions. The broiling board 21 is a non-porous board, and meanwhile can completely cover a hollowed-out opening, avoiding grease from dripping down to the outside of the frying basket.

The heating plate 5, made of an aluminum material, may be bonded with the broiling board 21, and protrude from the bottom of the cooking cavity 1 to form a boss, so that the broiling board 21, when being placed into the cooking cavity with the frying basket assembly 2, may be in direct contact with the heating plate 5.

As shown in FIGS. 1-4, the bottom of the frying basket body 23 is provided with a hollowed-out opening, the hollowed-out opening enables the broiling board 21 to be in direct contact with the heating plate 5, the broiling board 21 is detachably fixed at the bottom of the frying basket body 23 and covers the hollowed-out opening, the broiling board 21 is provided with several flow guide convex ribs 211, and the flow guide convex ribs 211 may support the food to expose an underside surface of the food, rendering better broiling and baking effects.

Figure 5:
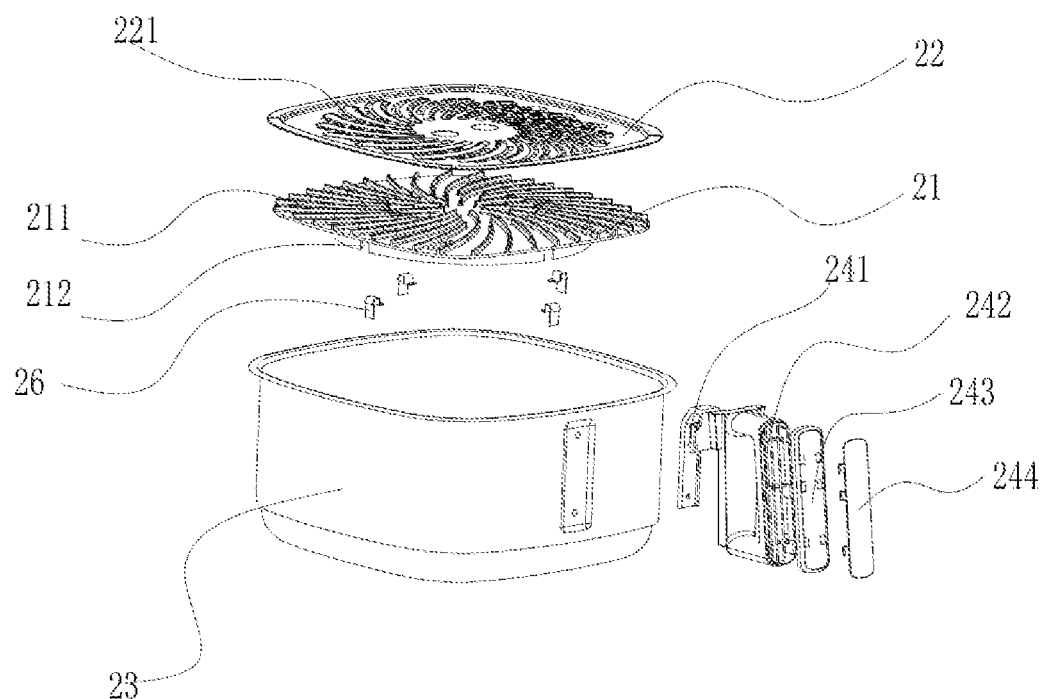
FIG. 5 is a perspective structural view of the frying basket assembly, in an exploded state, of the air fryer provided in the present disclosure.
Figure 6:
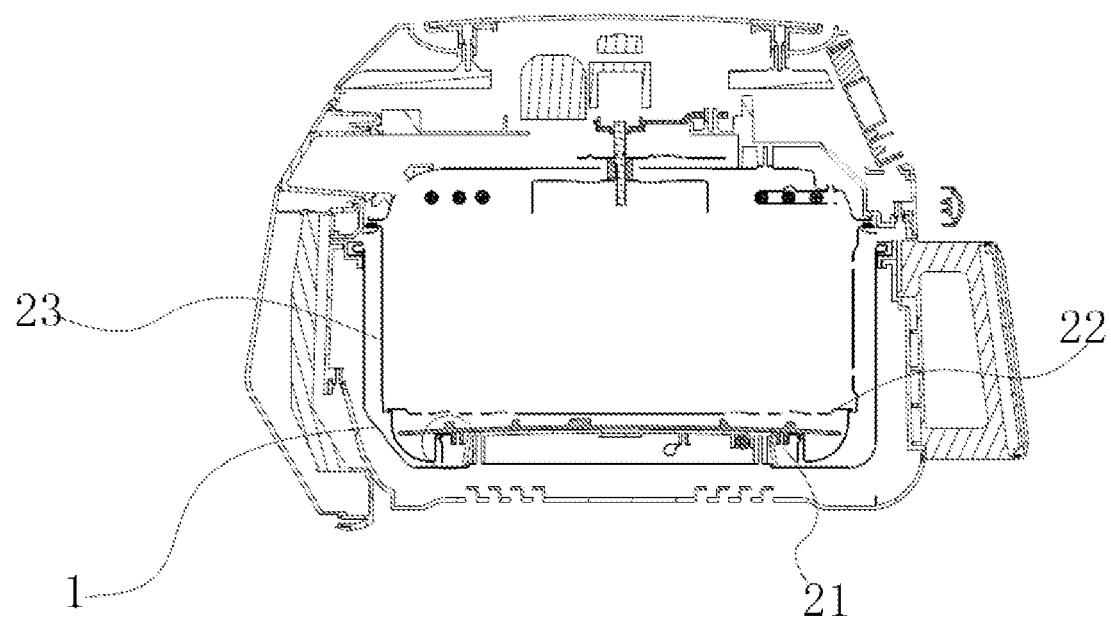
FIG. 6 is a front semi-sectional structural view of the air fryer, in an installation and use state, provided in the present disclosure.
Figure 7:
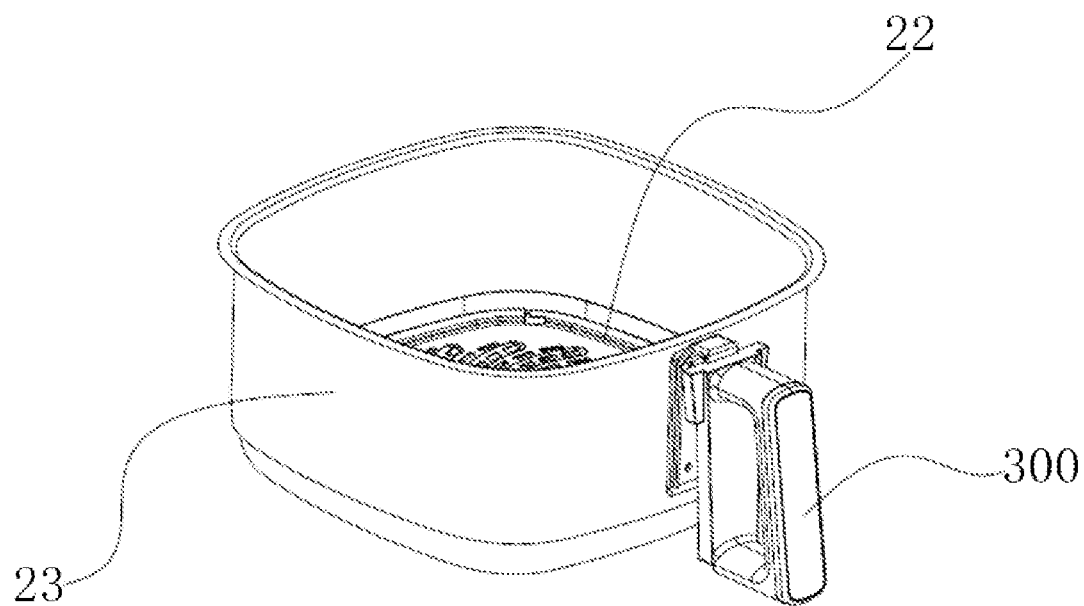
FIG. 7 is a perspective structural view of the air fryer provided in the present disclosure.

As an option of the flow guide convex ribs 211, as shown in FIG. 5, the flow guide convex ribs 211 are arc-shaped, and are arranged at intervals around a center portion of the broiling board 21. In addition to supporting food, the flow guide convex ribs 211 further may guide hot air while performing the broiling and baking functions and the air frying function, to converge airflow into the center portion of the broiling board, thus achieving a better cooking effect.

Figure 3:
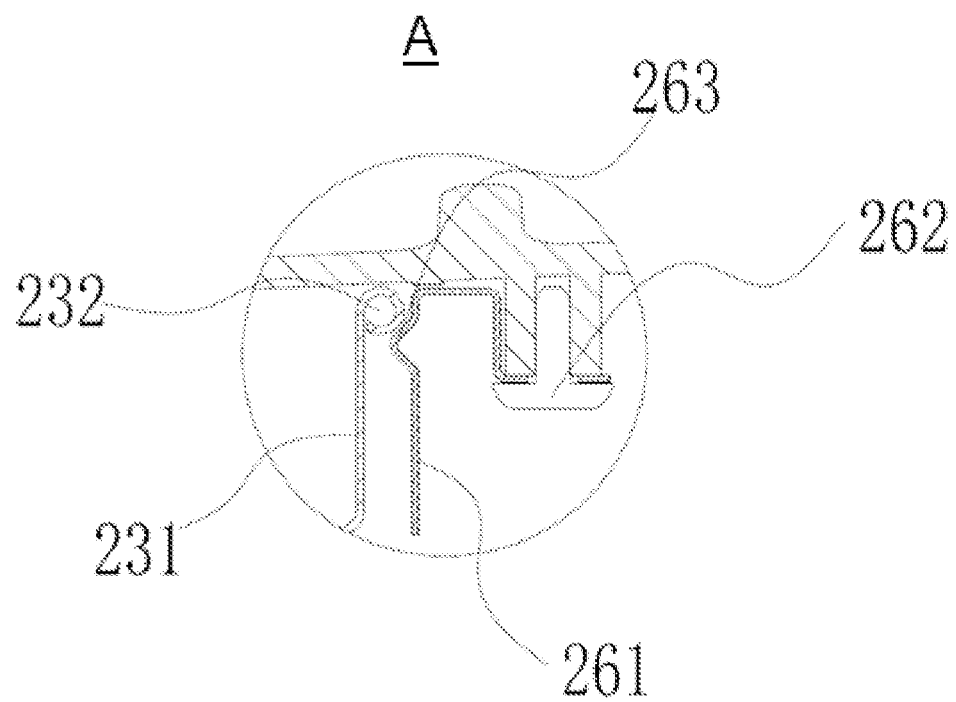
FIG. 3 is an enlarged structural view of a part A in FIG. 2.
Figure 4:
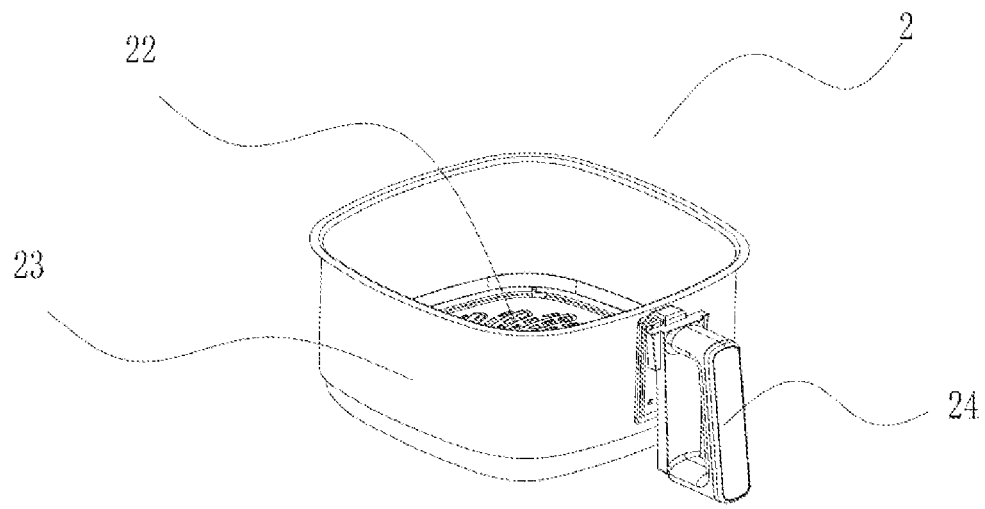
FIG. 4 is a perspective structural view of the frying basket assembly of the air fryer provided in the present disclosure.

As shown in FIGS. 3-4, at the hollowed-out opening at the bottom of the frying basket body 23, an upwardly extending enclosing portion 231 is provided so that a circle of groove is formed around the bottom of the frying basket body 23, an edge of the broiling board 21 extends to be located above the groove, and grease produced by the food during cooking may flow into the groove along the frying board or the broiling board.

Several elastic sheets 26 are installed at a lower side of the broiling board 21, and the elastic sheets 26 are uniformly arranged around a center of a lower side of the broiling board 21. Four, six or eight elastic sheets may be arranged, according to the size of the broiling board 21. The elastic sheets 26 are cooperatively clamped with a crimped portion 232 at the top of the enclosing portion 231. The crimped portion 232 may be embedded into and slid out from the elastic sheets due to the elasticity of the elastic sheets 26, realizing the detachable installation of the broiling board 21.

In order to prevent rotation or movement of the elastic sheets 26, several notches 212 are provided in a lower part of the broiling board 21, the elastic sheets 26 are provided in the notches 212 and each have one end connected and fixed to the broiling board 21 via a fastener 262. The elastic sheets 26 realize transverse limiting and vertical fixing through the notches 212 and the fasteners 262, ensuring the reliability of the installation of the elastic sheets 26.

The elastic sheet 26 is provided with a downward hand operating portion 261. A limiting protrusion 263 is provided in an upper part of the hand operating portion 261. The crimped portion 232 is clamped on an upper side of the limiting protrusion 263. A lower end of the hand operating portion 261 is deformed by stress to disengage the crimped portion 232 from the limiting protrusion 263. The broiling board may be firmly fixed by clamping the limiting protrusion 263 with the crimped portion 232, and the broiling board 21 may be detached only by being pulled upwards hard. When the broiling board 21 needs to be removed to clean, the hand operating portions 261 may be operated to enable the limiting protrusions 263 to slide out from the crimped portion 232. The operation is convenient. The hand operating portions 261 may also serve a guiding function when installing the broiling board 21.

A frying board 22 is provided in a middle lower part of the frying basket body 23 above the broiling board 21. A through hole 221 is provided in the frying board 22 and an edge of the frying board 22 is erected on a step 25 formed on a side wall of the frying basket body 23. The food may be placed on the frying board 22, and the food on the frying board 22 may be heated and cooked by the air fryer function. The frying board 22 and the broiling board 21 may be used together, and the placement of the frying board 22 will not affect the use of the broiling board 21, or they may also be used alone.

As shown in FIG. 5, the frying basket assembly 2 may be taken out from the cooking cavity 1, and the frying basket assembly 2 includes a handle assembly 24 mounted at one side of the frying basket body 23, and the handle assembly 24 enables the frying basket assembly 2 to be easily taken out from the cooking cavity 1.

The handle assembly 24 includes a connecting bracket 241 fixed to the frying basket body 23 and a handle portion 242 detachably connected to the connecting bracket 241. Through rapid connection between the connecting bracket 241 and the handle portion 242, rapid disassembly of the handle assembly 24 may be realized. Meanwhile, in order to improve the aesthetic appearance, a cover plate 243 and a decorative sheet 244 are installed on a side wall of the handle portion 242, and the decorative sheet 244 may be changed according to different models and aesthetic requirements.

As shown in FIG. 1, the heating device 3 and the heat circulation fan 4 are at least partially overlapped in a height direction, and the heating device 3 is provided around the outside of the heat circulation fan 4, then the overall height of the air fryer may be reduced.

As shown in FIGS. 6-10, the present disclosure further provides a frying basket structure for an air fryer, including:
a frying basket body 23, located in a cooking cavity 1 inside the air fryer, wherein a hollowed-out opening is provided at bottom of the frying basket body 23; and
a broiling board 21, detachably fixed at the bottom of the frying basket body 23 and covering the hollowed-out opening. By covering the hollowed-out opening with the broiling board 21, grease of food on the broiling board 21 will not flow to below the frying basket body 23, and the broiling board 21 is also easily fixed.

The broiling board 21 is provided with several flow guide convex ribs 211. The flow guide convex ribs 211 may support the food, so that an underside surface of the food is exposed, rendering better broiling and baking effects. The broiling board 21 herein is a non-porous board, and meanwhile can completely cover the hollowed-out opening, avoiding grease from dripping down to the outside of the frying basket.

Figure 10:
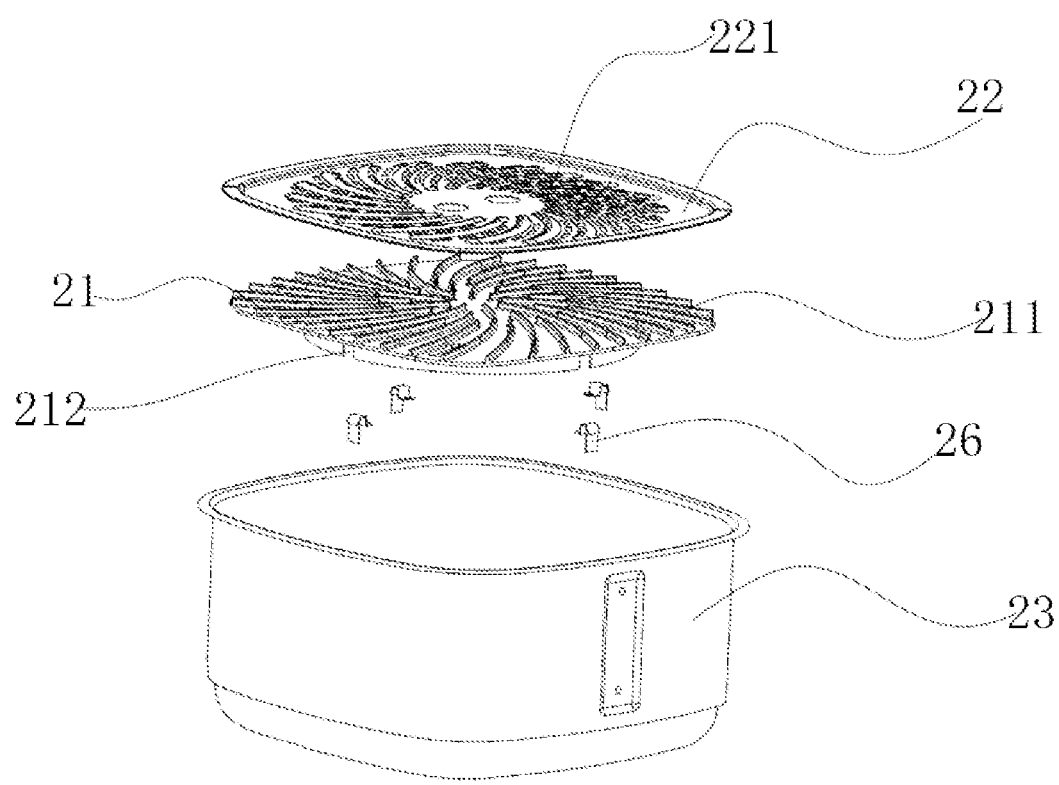
FIG. 10 is an exploded structural schematic view of the air fryer provided in the present disclosure.

As shown in FIG. 10, the flow guide convex ribs 211 are arc-shaped, and are arranged at intervals around a center portion of the broiling board 21. In addition to supporting food, the flow guide convex ribs 211 further may guide hot air while carrying out the broiling and baking functions and the air frying function, so as to converge airflow into the center portion of the broiling board 21 in a spiral shape, thus achieving a better cooking effect.

Figure 8:
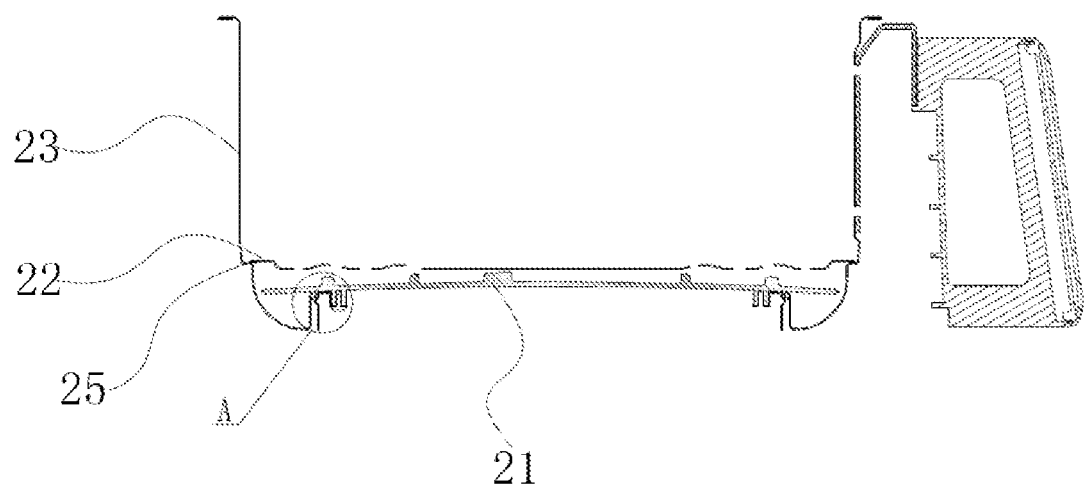
FIG. 8 is a front semi-sectional structural view of the air fryer provided in the present disclosure.
Figure 9:
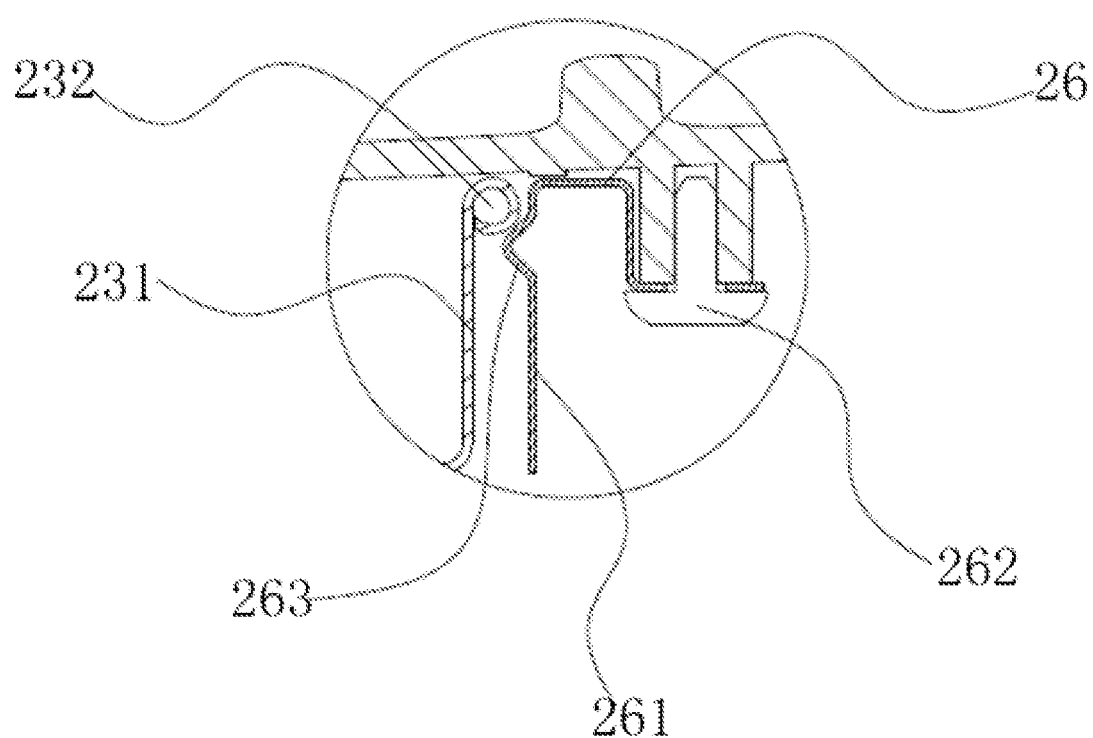
FIG. 9 is an enlarged structural view of a part A in FIG. 8.

As shown in FIGS. 8-9, at the hollowed-out opening at the bottom of the frying basket body 23, an upwardly extending enclosing portion 231 is provided so that a circle of groove is formed around the bottom of the frying basket body 23, and an edge of the broiling board 21 extends to be located above the groove. Grease produced by the food during cooking may flow into the groove along the frying board 22 or the broiling board 21.

As one installation structure of the broiling board 21, several elastic sheets 26 are installed at a lower side of the broiling board 21, the elastic sheets 26 are cooperatively clamped with a crimped portion 232 at the top of the enclosing portion 231. The crimped portion 232 may be embedded into and slid out from the elastic sheets 26 due to the elasticity of the elastic sheets 26, realizing the detachable installation of the broiling board 21. Several notches 212 are provided in a lower part of the broiling board 21, and the elastic sheets 26 are provided in the notches 212 and each have one end connected and fixed to the broiling board 21 via a fastener 262. The elastic sheets 26 realize transverse limiting and vertical fixing through the notches 212 and the fasteners 262, ensuring the reliability of the installation of the elastic sheets. The bottom of the broiling board 21 is provided with several bosses corresponding to the elastic sheets 26, and an end of the fastener 262 passing through the elastic sheet 26 is connected to the boss.

The elastic sheet 26 is provided with a downwardly extending hand operating portion 261. A limiting protrusion 263 is provided in an upper part of the hand operating portion 261. The crimped portion 232 is clamped on an upper side of the limiting protrusion 263. A lower end of the hand operating portion 261 is deformed by stress to disengage the crimped portion 232 from the limiting protrusion 263. The broiling board 21 may be firmly fixed by clamping the limiting protrusion 263 with the crimped portion 232, and the broiling board 21 may be detached only by being pulled upwards hard. When the broiling board 21 needs to be removed to clean, the hand operating portions 261 may be operated to enable the limiting protrusions 263 to slide out from the crimped portion 232. The operation is convenient.

The hand operating portions 261 may also serve a guiding function when installing the broiling board 21.

As shown in FIG. 8, a frying board 22 is provided in a middle lower part of the frying basket body 23 above the broiling board 21. A through hole 221 is provided in the frying board 22 and an edge of the frying board 22 is erected on a step 25 formed on a side wall of the frying basket body 23. The food may be placed on the frying board 22. The frying board may be used together with the broiling board 21, or may also be used alone.

A handle 300 is installed at one side of the frying basket body 23, so that the frying basket body 23 is conveniently taken out from or put into the cooking cavity.

A heating tube 400 may be directly installed at the lower side of the broiling board 21, and the heating efficiency of the broiling board 21 will be higher.

The broiling board 21 may be used alone during use, or may also be turned on simultaneously with thermal circulation inside the air fryer, so as to cook the food, and render a good effect.

Although the present disclosure has been described in the above with reference to the embodiments, various improvements may be made to the present disclosure and components therein may be replaced by equivalents, without departing from the scope of the present disclosure. In particular, as long as there is no structural conflict, various features in the embodiments disclosed in the present disclosure may be used in combination with each other in any manner, while these combinations are not enumerated in the present specification only for the sake of saving space and resource. Therefore, the present disclosure is not restricted to specific embodiments disclosed herein, but covers all technical solutions falling within the scope of the claims.

INDUSTRIAL APPLICABILITY

In the air fryer having broiling and baking functions and the frying basket structure for an air fryer provided in the present disclosure, the heating plate is provided at the bottom of the cooking cavity, the center of the bottom of the frying basket body is hollowed out, the broiling board is provided at the hollowed-out part, after the frying basket assembly is placed in the cooking cavity, the broiling board is just provided close to the heating plate, therefore, the broiling board will have a higher temperature, and may directly broil and bake the food placed thereon. The broiling board is provided with the flow guide convex ribs thereon, and food such as fish may be directly placed on the broiling board to be broiled and baked, so that the conventional air fryer is enabled to have the broiling and baking functions, and the use range of the air fryer is enlarged.

What is claimed is:

1. An air fryer having broiling and baking functions, comprising:
   a cooking cavity, located in the air fryer, wherein a hot air frying system consisting of a heat circulation fan and a heating element is mounted in an upper part of the cooking cavity,
   a heating plate, provided at a bottom of the cooking cavity; and
   a frying basket assembly, provided in the cooking cavity, wherein the frying basket assembly comprises a frying basket body and a broiling board provided at a bottom of the frying basket body, and the broiling board is heated by the heating plate,
   wherein the bottom of the frying basket body is provided with a hollowed-out opening, the broiling board is detachably fixed at the bottom of the frying basket body and covers the hollowed-out opening, and the broiling board is provided with several flow guide convex ribs,
   an upwardly extending enclosing portion is provided at the hollowed-out opening at the bottom of the frying basket body, so that a circle of groove is formed around the bottom of the frying basket body, and an edge of the broiling board extends to be located above the groove, and
   several elastic sheets are mounted at a lower side of the broiling board, and the elastic sheets are cooperatively snapped with a crimped portion of the enclosing portion at a top of the enclosing portion,
   wherein several notches are provided in a lower part of the broiling board, and the elastic sheets are provided in the notches and each of the elastic sheets has one end connected fixedly to the broiling board via a fastener.

2. The air fryer having broiling and baking functions according to claim 1, wherein the flow guide convex ribs are arc-shaped, and are arranged at intervals around a center portion of the broiling board.

3. The air fryer having broiling and baking functions according to claim 1, wherein each of the elastic sheets is provided with a downwardly extending hand operating portion, a limiting protrusion is provided in an upper part of the hand operating portion, the crimped portion is snapped on an upper side of the limiting protrusion, and a lower end of the hand operating portion is deformed by stress to disengage the crimped portion from the limiting protrusion.

4. The air fryer having broiling and baking functions according to claim 1, wherein a frying board is provided in a middle lower part of the frying basket body above the broiling board, a through hole is provided in the frying board and an edge of the frying board is erected on a step formed on a side wall of the frying basket body.

5. The air fryer having broiling and baking functions according to claim 1, wherein the frying basket assembly can be taken out from the cooking cavity, and the frying basket assembly comprises a handle assembly mounted at one side of the frying basket body, wherein the handle assembly comprises a connecting bracket fixed to the frying basket body and a handle portion detachably connected to the connecting bracket, and a cover plate and a decorative sheet are mounted on a side wall of the handle portion.

6. The air fryer having broiling and baking functions according to claim 1, wherein the heating element and the heat circulation fan are at least partially overlapped in a height direction, and the heating element is provided around an outside of the heat circulation fan.

\* \* \* \* \*